Patented Aug. 12, 1930

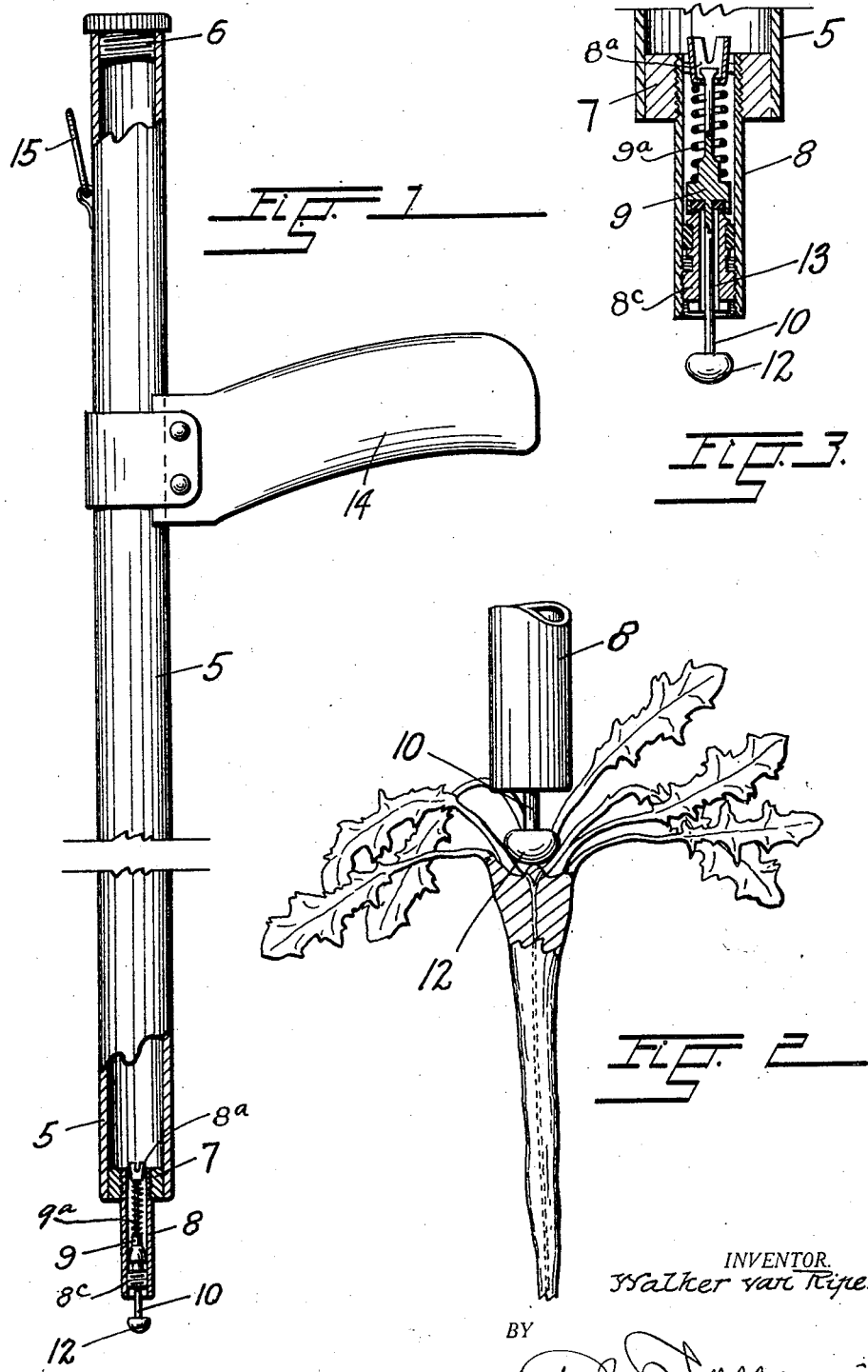

1,772,763

UNITED STATES PATENT OFFICE

WALKER VAN RIPER, OF DENVER, COLORADO

DANDELION EXTERMINATOR

Application filed October 25, 1927. Serial No. 228,616.

This invention relates to dandelion exterminators and its main object is to provide a simple appliance adapted to discharge a noxious liquid onto the crown of a plant exclusive of the ground around the same.

My invention is based on the knowledge acquired by experimentations extending over a long period of time, that if a certain quantity of gasolene or other similar destructive liquid is deposited on the crown of a dandelion plant immeditely above the root, the liquid will in a comparatively short time permeate the entire root to the very end thereof and thereby kill the plant.

Grass growing around the weed is not affected and inasmuch as the treatment destroys the entire root of the dandelion, the weed is permanently exterminated and will not grow again as is the case when even a small part of the root remains alive in the soil.

In order to deposit the gasolene onto the weed in the proper manner and without unnecessary effort, I have devised an appliance which I have found to be practical and efficient from every point of view.

The principal requirements of the device are; first, that it does not penetrate the weed to which it is applied; second, that it discharges gasolene only onto the crown of the plant immediately above the root and not elsewhere; and third, that it readily finds its way to its proper place with respect to the plant without much effort on the part of the operator.

All of the above essentials are combined in the device shown in the accompanying drawings which represents a preferred embodiment of the invention.

Figure 1 of the drawings represents a partially sectional and partially broken side elevation of an exterminator made in accordance with my invention, Figure 2, an elevation of the lower end portion of the device showing the method of applying it to a dandelion, and Figure 3, a longitudinal section of the valve at the lower end of the appliance, that controls the discharge of liquid.

Similar characters of reference designate corresponding parts throughout the views.

The exterminator as shown comprises a tubular reservoir 5 closed at its upper end by a filler plug or cap 6, and having at its lower end an annular plug 7 for the attachment of a downwardly projecting tubular valve housing 8 that provides a nozzle through which in the operation, the liquid is deposited on the plant. The valve 9 in the housing is of the spring-urged type commonly found on automobile tires and it is per se not a part of the present invention. The valve 9 has as usual, a stem 10 shouldered for the support of a coil spring $9^a$ that at its opposite end abuts against a stop $8^a$ fixed in the inner end of the valve-housing 8. The seat for the valve is provided by an axially bored plug $8^c$ screwed into the outer end of the valve-housing.

The stem 10 of the valve projecting beyond the end of the valve housing, has a knob 12 with which to engage the dandelion plant as illustrated in Figure 2 of the drawings.

The contact of the knob with the plant pushes the valve off its seat and thereby permits gasolene to flow from the reservoir through the passage 13 around the valve stem and through the open end of the valve-housing onto the dandelion plant.

In order to insure the discharge of the gasolene onto the crown of the plant above the root it is necessary that the discharge passage of the valve housing is within an area smaller than the average size of the crown of the plant and that the knob is sufficiently small to leave the surrounding portion of the crown uncovered to receive the gasolene. The knob, having a rounded and non-angular plant-engaging surface, prevents penetration of the plant and if it were of a larger size or if the discharge passage of the valve housing were differently located the objects of the invention hereinbefore related could not be attained.

The crown of a dandelion plant is slightly hollowed immediately above the root as indicated in Figure 2, and by rounding the knob at its underside, it is enabled to find its way to the center of the dandelion plant and there come to rest without effort on the part of the operator.

The tubular reservoir may be provided with a laterally projecting handle 14 to facilitate its operation and it may furthermore be equipped with a ring 15 for its suspension when not in use.

As has been stated hereinbefore, the present invention is distinguished from other devices used for similar purposes in that it does not penetrate the plant but merely deposits the gasolene on top thereof. The advantage of this highly important feature of the invention is that even though the knob on the valve stem does not hit the plant in its exact center the gasolene will drain toward the middle of the crown of the plant and thence seep through the root.

If the stem were capable of penetrating the object with which it is brought in contact, any aperture made otherwise than in a true vertical direction and in the exact center of the plant would cause the flow to deviate from a straight downward line, and the root of the plant would not be completely saturated with the liquid as is necessary to permanently destroy the plant.

Having thus described my invention, what I claim and desire to secure by Letters Patent is—

1. A weed exterminating tool comprising a tubular reservoir, a discharge nozzle at an end of the tube having a valve seat, a spring pressed valve cooperating with the seat to normally close the nozzle against the outflow of liquid from the reservoir, a stem on the valve projecting beyond the nozzle, and a knob at the lower end of the stem having a rounded plant engaging surface, said knob having a diameter slightly less than the diameter of said nozzle, whereby engagement of the knob with the hollow center of the crown of a weed will be effective to permit flow of liquid from the reservoir over the knob to form a pool of the liquid in said hollow crown.

2. A weed exterminating tool comprising a tubular reservoir, a filler cap at an end of the reservoir, a discharge nozzle at the opposite end thereof, and having a valve seat, a spring pressed valve cooperating with the seat to normally close the nozzle against the outflow of liquid from the reservoir, a stem on the valve projecting beyond the nozzle, and an enlarged knob at the lower end of the stem having a non-angular plant engaging surface, said knob having a diameter slightly less than the internal diameter of said nozzle whereby engagement of the knob with tthe hollow center of the crown of a weed will be effective to permit flow of liquid from the reservoir over the knob to form a pool of liquid in said hollow crown, and a laterally projecting handle on the reservoir to aid in positioning the knob in the hollow center of the crown of the weed In testimony whereof I have affixed my signature.

WALKER VAN RIPER.